US012446720B2

(12) United States Patent
O'Hanlon

(10) Patent No.: US 12,446,720 B2
(45) Date of Patent: Oct. 21, 2025

(54) EGG HOLDER AND METHOD OF USE

(71) Applicant: Carolyn Loh O'Hanlon, Nyack, NY (US)

(72) Inventor: Carolyn Loh O'Hanlon, Nyack, NY (US)

( * ) Notice: Subject to any disclaimer, the term of this patent is extended or adjusted under 35 U.S.C. 154(b) by 0 days.

(21) Appl. No.: 18/591,944

(22) Filed: Feb. 29, 2024

(65) Prior Publication Data

US 2025/0275641 A1   Sep. 4, 2025

(51) Int. Cl.
| A47G 33/00 | (2006.01) |
| A47G 33/08 | (2006.01) |
| A47G 33/10 | (2006.01) |
| B44C 5/00  | (2006.01) |
| B44C 5/08  | (2006.01) |
| F16M 13/00 | (2006.01) |
| F16M 13/02 | (2006.01) |

(52) U.S. Cl.
CPC ............ *A47G 33/00* (2013.01); *A47G 33/08* (2013.01); *A47G 33/10* (2013.01); *B44C 5/00* (2013.01); *B44C 5/08* (2013.01); *F16M 13/005* (2013.01); *F16M 13/02* (2013.01)

(58) Field of Classification Search
CPC ........ A47G 33/08; A47G 33/10; A47G 33/00; F16M 13/005; F16M 13/02; F21V 5/06; B44C 5/00; B44C 5/08; E04B 9/006
USPC .......................... 248/692, 317, 339, 340, 341
See application file for complete search history.

(56) References Cited

U.S. PATENT DOCUMENTS

| 1,444,542 | A | * | 2/1923 | Grossheim | ........... A63B 69/222 248/317 |
| 2,067,528 | A | * | 1/1937 | Greene | .................. A47G 33/08 24/369 |
| 2,547,124 | A | * | 4/1951 | Hudson | ................ A63B 69/222 403/71 |
| 3,223,373 | A | * | 12/1965 | Molinaro | ............... A47G 33/08 248/339 |
| 4,887,785 | A | * | 12/1989 | Blaich | ...................... F16B 45/00 24/716 |
| 5,116,009 | A | * | 5/1992 | Bayer | ....................... F21V 5/06 248/303 |
| 5,175,029 | A | * | 12/1992 | Peterson | ................ A47G 33/08 428/7 |
| 5,285,364 | A | * | 2/1994 | Bayer | ....................... F21V 5/06 24/698.3 |
| 5,588,744 | A | * | 12/1996 | Lucas | ....................... F21V 5/06 362/405 |
| 5,822,088 | A | * | 10/1998 | Danno | ................... G03H 1/265 359/32 |
| 5,906,430 | A | * | 5/1999 | Bayer | .................. F21V 17/164 362/406 |
| 5,937,553 | A | * | 8/1999 | Maran | ...................... G09F 1/06 40/124.14 |
| D421,712 | S | * | 3/2000 | Brown | ........................... D8/367 |
| 6,146,721 | A | * | 11/2000 | Freynet | ................. A63F 9/0811 446/236 |

(Continued)

*Primary Examiner* — Eret C McNichols
(74) *Attorney, Agent, or Firm* — Sam Pierce

(57) ABSTRACT

According to one aspect of the present invention disclosed herein, there is provided nest for a synthetic ornament, comprising: an ornament having holes on two ends; a curve configured to provide space for the ornament; pegs configured to fit securely into the holes both ends of the ornament; and loops on each end configured to attach to adjacent nests.

11 Claims, 2 Drawing Sheets

(56) References Cited

U.S. PATENT DOCUMENTS

| | | | | |
|---|---|---|---|---|
| 6,155,526 | A * | 12/2000 | Brown | A47G 33/10 248/303 |
| D436,838 | S * | 1/2001 | Kirk | D8/370 |
| 6,682,032 | B1 * | 1/2004 | Bradlee | A47F 5/0006 248/908 |
| 6,921,561 | B1 * | 7/2005 | Maier | A47G 33/08 248/692 |
| 7,008,679 | B2 * | 3/2006 | Cohen | G10D 13/24 428/34.1 |
| 7,217,014 | B2 * | 5/2007 | Nielson | F21S 8/065 362/398 |
| 7,225,851 | B2 * | 6/2007 | Schonbek | F21S 4/28 160/332 |
| D560,924 | S * | 2/2008 | Walker | D8/367 |
| 7,770,533 | B2 * | 8/2010 | Ramirez | A01M 29/06 116/DIG. 33 |
| 7,871,651 | B2 * | 1/2011 | Sinichko | A23G 3/563 426/414 |
| 8,859,024 | B2 * | 10/2014 | Gass | B65D 65/463 426/138 |
| 10,531,749 | B1 * | 1/2020 | Houdashell | A47F 5/025 |
| 11,205,354 | B2 * | 12/2021 | Rostami | G09B 27/08 |
| 11,617,455 | B2 * | 4/2023 | Houdashell | A47F 5/025 312/140 |
| 2001/0005520 | A1 * | 6/2001 | Costantini | A23G 3/563 426/138 |
| 2009/0166499 | A1 * | 7/2009 | Hamlin | A47G 33/10 248/341 |
| 2012/0266424 | A1 * | 10/2012 | Martino | A61G 17/08 27/1 |
| 2014/0092589 | A1 * | 4/2014 | Van Dyn Hoven | F21V 9/00 362/122 |
| 2016/0230966 | A1 * | 8/2016 | DeFrancesco | F21V 3/02 |
| 2023/0012261 | A1 * | 1/2023 | Millimaci | A47G 33/10 |
| 2023/0071235 | A1 * | 3/2023 | Freudenthal | A47G 33/08 |

* cited by examiner

EGG HOLDER AND METHOD OF USE

BACKGROUND

Easter celebrations involving decorating eggs often use real eggs, such as chicken eggs, wherein the shell of the egg is cracked to form a hole on one end of the eggs. The contents of the egg including the egg yolk and egg whites are emptied from within the egg. The egg must then be cleaned and dried before decorating. Depending on the decorating process, the medium used, whether it is paint, glue, marker, etc. must then dry again. Systems and methods for decoration of eggs have been described in the prior art patent literature.

For example, U.S. Pat. No. 6,110,514 discloses a method for positioning an egg in preparation for decorative dying and painting of the egg exterior includes providing annular disk having circular inner and outer peripheries with circular cross-section beads extending circumferentially continuously around the entirety of the disk of the inner and outer disk extremities, positioning the disk lying flat on a planar surface and positioning the larger radius egg and facing substantially downward in the interior of the disk thereby permitting the egg to rest on the disk in an upright position.

Synthetic eggs have also been described in the prior art patent literature.

For example, US20160340095 discloses a synthetic egg including an egg shaped unitary body formed of a synthetic biodegradable material. The unitary body includes an inner volume. An aperture extends through an end of the unitary body and provides accesses to the inner volume of the unitary body. A filling material is inserted within the inner volume through the aperture. The filling material may include confetti, candy, a toy and the like. The unitary body is breakable into a plurality of non-uniform pieces and the filling material is accessed after insertion within the inner volume in response to breaking the unitary body into a plurality of non-uniform pieces. The synthetic biodegradable material may include a starch based biodegradable material.

However, prior art systems and methods for decorating eggs, e.g. for Easter are lacking at least in convenience and ease of use.

SUMMARY OF INVENTION

Therefore, the present invention discloses a method and system for decorating and/or painting an egg or ornament, and then using the same system for hanging the ornament for drying and/or display.

According to one aspect of the present invention disclosed herein, there is provided a holder, or "Nest" for a synthetic ornament, comprising: an ornament having holes on two ends; a curve configured to provide space for the ornament; pegs configured to fit securely into the holes on both ends of the ornament; and loops on each end configured to attach to adjacent nests.

According to another aspect of the present invention, there is provided a method of decorating an ornament, comprising: providing a hollow ornament having holes on two ends; decorating the ornament; threading a holder through the two holes; and hanging the holder.

DETAILED DESCRIPTION

Figure 1:
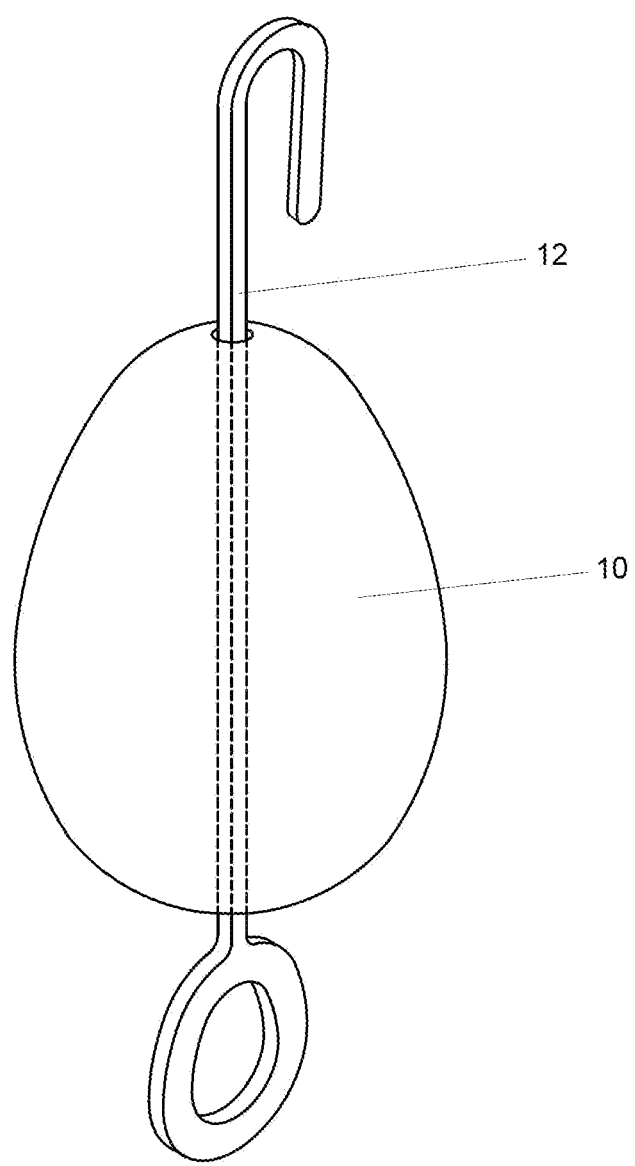
FIG. 1 illustrates an egg and a wire hook.

FIG. 1 illustrates an egg and a wire hook.

Egg 10 is shown with wire 12 running through egg 10. It is possible to drill holes in the ends of real eggs, blow the yolks out, wash them, and leave them out to dry, then take a small wire, poke it through the hole on one end of the egg, thread it through the top hole, bend the wire at both ends to create hooks, and use the wire as a handle while painting the egg. The hooks on either end of the egg would double as a hanging device. The painted eggs could then be hung out to dry using the hooks to hang from each other vertically. When the eggs are dry, it would be possible to tie thread to matchsticks, poke them through the top holes of the eggs, and hang them from tree branches and chandeliers for display purposes.

However, this process is not easy, many eggs break in the process, and the blowing-of-the-yolks is also unpleasant.

Therefore, the present invention also provides a system and method, called the Egg Party system, which achieves many of the benefits of the traditional method without the drawbacks.

Figure 2:
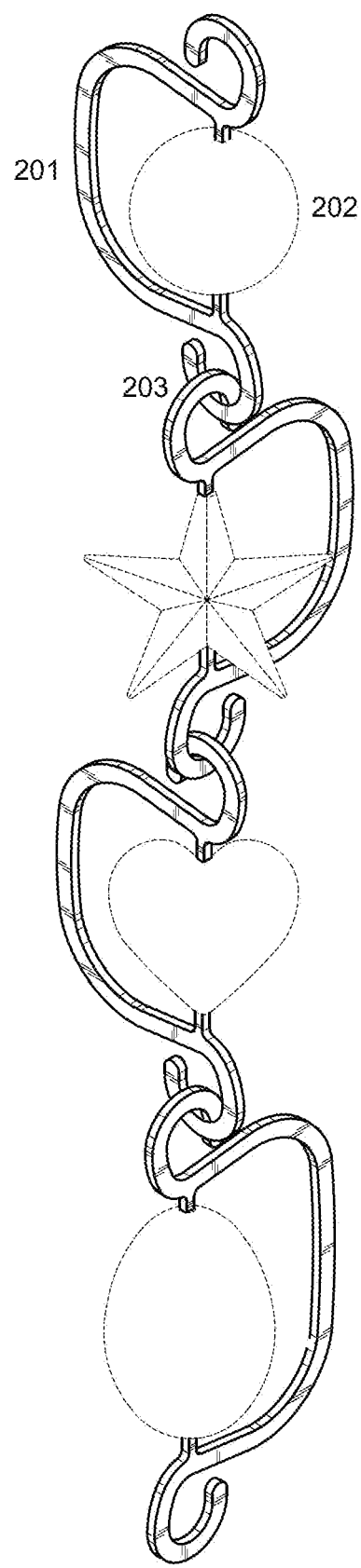
FIG. 2 illustrates a nest holding a synthetic egg and/or other shapes according to the present invention.

FIG. 2 illustrates a nest and synthetic ornaments (including an egg shape) according to the present invention.

The wire egg holder/hanger 201 is integral to the functionality of the Egg Party system. The hanger, which can be referred to as the Nest, serves the same function as a bendable wire hook, with a safe, unique shape and pleasing aesthetic. The Nest gently but firmly holds the egg 202 in place. It provides the surface area necessary for a firm grip while painting or decorating.

Loops on each end allow multiple Nests to hang vertically as shown in junction 203 so the eggs they hold can dry.

Small pegs in the Nest fit securely into the holes on either end of the Egg. The user still has the ability to easily turn the Egg to reach unpainted/decorated areas, but the Egg is secure, and will not fall out of the Nest.

The ornament of the present invention can be manufactured in a variety of shapes including an egg, but not limited to an egg shape, as a sphere, heart, star, cube, and pyramid are among other options.

The egg looks and feels exactly like a real jumbo-size hollow chicken egg. The egg will be manufactured using a blow mold process, with ¼" holes on either end. The material will be synthetic, similar to the shell of a ping pong ball, right down to the bounce. It can be made virtually unbreakable.

The ornament can be manufactured via blow mold technology using a synthetic material, rendering it unbreakable. The ornament can be seamless, removing any evidence of the blow mold. The ornament can be coated with a base paint for optimum adhesion of paint and glue. The ornament can be hollow with two small holes on either end, one at the top of the ornament and one at the bottom.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description.

In particular, the holes on the top and bottom of the Egg (and other shaped ornaments) present additional uses and opportunities using snap-pop bead technology.

Decorated Eggs/ornaments can be strung together using blow-molded snap-pop connector beads. When linked together the Eggs/ornaments form a garland of Eggs/Ornaments.

Accessories can also be secured to the tops and/or bottoms of the Egg/Ornament for decoration or display. The design of these accessories have limitless possibilities: a flower, birthday balloon, licensed character, etc.

While the treatment for the accessory will vary, the portion inserted into the Egg/ornament is always the same—using the "bead" to secure the Top Accessory or Base Accessory to the Egg/ornament.

Other embodiments may be utilized and derived from the present invention, such that structural and logical substitutions and changes may be made without departing from the scope of this disclosure.

Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A nest for a synthetic ornament, comprising:
   an ornament having holes on two ends;
   a curve configured to define a space for the ornament coming to a fork at a top and a fork at a bottom;
   two pegs extending from the fork at the top and the fork at the bottom of the defined space for the ornament configured to fit securely into the holes on both ends of the ornament;
   a first annular component extending first upwardly from a top end of the curve and then extending around downwardly towards the curve to form a first loop at the first terminal end; and
   a second annular component extending first downwardly from a bottom end of the curve and then extending around upwardly towards the curve to form a second loop at the second terminal end configured to insert in the first or second loop of an adjacent nest,
   wherein the pegs extend away from the direction of the annular loops into the space.

2. The nest for a synthetic ornament of claim 1, wherein the ornament is an egg.

3. The nest for a synthetic ornament of claim 1, wherein the ornament is an sphere.

4. The nest for a synthetic ornament of claim 1, wherein the ornament is heart-shaped.

5. The nest for a synthetic ornament of claim 1, wherein the ornament is a pyramid.

6. The nest for a synthetic ornament of claim 1, wherein the ornament is a cube.

7. The nest for a synthetic ornament of claim 1, wherein the curve has a rectangular cross-section.

8. A method of decorating an ornament, comprising:
   providing a hollow ornament having holes on two ends;
   decorating the ornament; and
   inserting the ornament in the nest of claim 1;
   wherein the nest provides the surface area necessary for a firm grip while painting;
   wherein pegs in the nest fit securely into the holes on either end of the ornament and a user has the ability to easily turn the ornament to reach unpainted areas, while the ornament is secure from falling out of the nest.

9. The method of claim 8, wherein the ornament is a chicken egg.

10. The method of claim 8, wherein the ornament is synthetic.

11. The method of claim 8, wherein ornament is coated with a base for optimum adhesion of paint.

* * * * *